Figure 1:
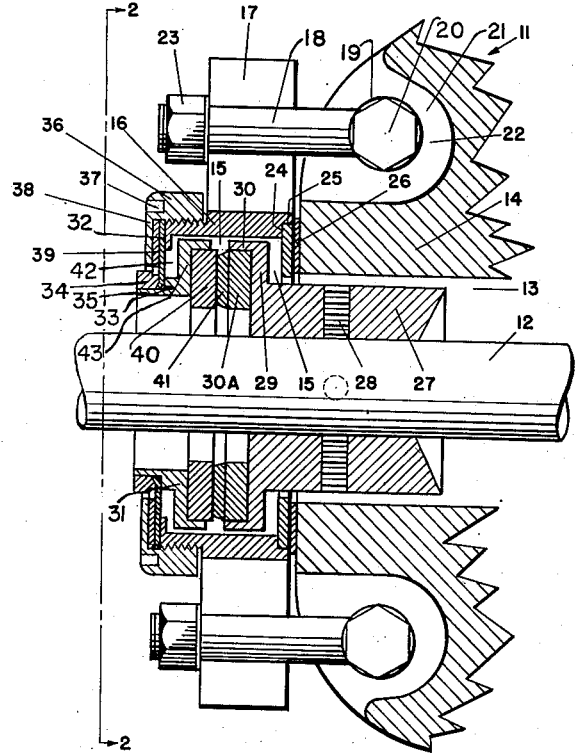

Aug. 3, 1954  M. R. POLLARD, JR  2,685,463

SHAFT SEAL

Filed Dec. 27, 1949

INVENTOR

MELVILLE R. POLLARD, JR.

BY George R Bliss

ATTORNEY

Patented Aug. 3, 1954

2,685,463

UNITED STATES PATENT OFFICE 2,685,463

SHAFT SEAL

Melville R. Pollard, Jr., Encino, Calif., assignor, by mesne assignments, to Jet Shaft Seals, Inc., Los Angeles, Calif., a corporation of Arizona Application December 27, 1949, Serial No. 135,237

1 Claim. (Cl. 286—11)

This invention relates to shaft seals for use in preventing fluid leakage from fluid chambers along the joint or clearance between the chamber wall and a relatively rotating shaft, as for example between a centrifugal pump housing and the shaft therefor.

The invention particularly relates to shaft seals comprising a stationary seal housing attachable to the pump housing, two sealing elements, one of which is non-rotatively mounted within or on the housing, and the other of which is mounted on the shaft to rotate therewith, the two elements having slidably engaging radially extending sealing surfaces disposed in a plane perpendicular to the shaft axis, and means for urging one of the elements into pressural engagement with the other element.

In this type of shaft seal, one of the sealing elements is movable slightly within the seal housing in the direction of the shaft axis to effect a pressural seal between the two sealing elements. The joint or clearance permitting this slight movement between the axially movable element and either the seal housing or the shaft as the case may be, must be sealed to prevent fluid leakage. The other sealing element which is mounted so as to be incapable of axial movement is secured to the shaft or seal housing as the case may be, in fluid tight relation therewith. In the disclosure of the invention set forth in the following specification and in the drawings, the axially movable element is mounted on the seal housing in a manner to permit such movement and is sealed from the escape of fluid by means of an annular flexible diaphragm secured at its outer periphery to the housing and at its inner periphery to the sealing element.

An object of this invention is to provide a seal of this type in which the fluid pressure in the fluid chamber is utilized as the principal means for holding the sealing elements in sealing contact. The sealing pressure between the sealing elements, when supplied by the fluid pressure within the pump chamber, varies in magnitude and is roughly a function of the pump pressure, a condition which makes it possible to so design the seal that the sealing pressure may always be adequate to prevent separation of the sealing elements even at the highest pump fluid pressures occurring with any given installation, and yet always be at a minimum value for each value of the pump fluid pressure. Thus the wear of the sealing faces of the two sealing elements is reduced to a minimum.

It is apparent that if the pressure by which the sealing surfaces are held in contact is provided by springs and is therefore of a fixed value, it must be great enough to provide an effective seal to withstand the highest pump pressures to which the seal is subjected. It is also apparent that the sealing pressure is then much more than adequate for values of fluid pressure in the pump chamber of a centrifugal pump under starting conditions or when operating under conditions of continuous low pressure.

When the pump is idle, there may, in some installations or under some circumstances, be no fluid pressure to hold the sealing surfaces into contact. When the pump comes to rest after a period of operation, the residual fluid in the pump chamber must be sealed against leakage. This is particularly true when the fluid which is being handled by the pump is a liquid and especially when either the gas or liquid is of a corrosive or other destructive character. Consequently, a sealing pressure of some kind and at least of a small value, must be available for preventing the escape of fluid when the pump is idle. Also at times when due to surging within the pump an endwise movement of the shaft takes place relative to the pump housing, the sealing elements may be separated at the plane of their sealing contact. If fluid pressure is the only pressure afforded for maintaining a contact between the sealing elements, at such times as they become thus separated, the high pressure fluid will escape through the joint between the sealing surfaces of the sealing elements. After the opening between the sealing faces has been once effected, fluid will continue to flow therethrough and no matter how high the fluid pressure, this escape flow will continue.

It thus becomes essential in the design of a shaft seal of the radial sealing surface contact type, to provide a small axially directed pressure, in addition to the axially directed fluid pressure, which shall always be available for holding the sealing surfaces in contact at such times as when the pump is idle or when the sealing surfaces become momentarily and accidentally separated during the operation of the pump, either because of surging within the pump or from any other cause.

It is one of the objects of this invention to provide in a shaft seal of the type employing fluid pressure as the sealing force, means providing a supplementary or standby sealing force of a simple, reliable and long lived character to maintain the sealing contact when the pump is idle or to re-establish it when the sealing elements have been temporarily separated due to surging or other causes.

Longitudinally acting springs have been extensively employed to provide this supplementary standby sealing force. It is a further object of this invention to provide in lieu of springs, means whereby the force of magnetism is utilized to effect this standby pressure.

Since in low pressure equipment, the advantage of fluid pressure as the sealing force is of little importance, the shaft seal may be so designed that the only sealing force is of the same character as that which, in fluid pressure energized seals, serves as a supplementary or standby sealing pressure. Accordingly in a seal of this invention, the sealing force may be solely that supplied by the attraction between two magnetic bodies secured to the sealing elements respectively. It is therefor a further object of the invention to provide a shaft seal in which the force of magnetism is utilized to hold the rotatively slidable sealing surfaces in contact with each other.

It is also an object to provide a shaft seal utilizing the force of magnetism as either the standby sealing force or the sole sealing force, which shall be of simple design, inexpensive to manufacture, without need for adjustment, readily accessible for repair and replacement of parts and subject to a minimum of wear and breakage.

Other objects and advantages of the invention to be presently described, will be apparent from a reading of the following description and a study of the accompanying drawing of an illustrative embodiment of the invention.

Figure 2:
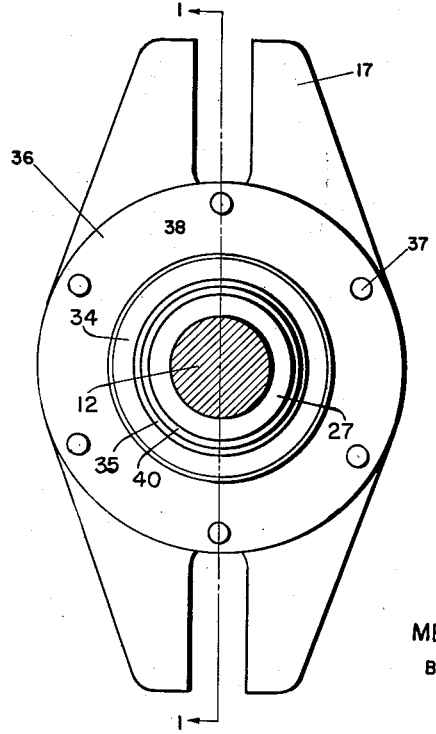

In the drawings, Figure 1 is a longitudinal section of a shaft seal of this invention shown in operative relation with a centrifugal pump housing and shaft, taken along the line 1—1 of Figure 2.

Figure 2 is a left hand end view of the seal shown in Figure 1 with the pump housing and studs by which the seal is secured to the housing removed for the sake of clarity.

In the drawings, the invention is shown as applied to a centrifugal pump, although it will be understood that the invention is applicable wherever there is need for a fluid seal between a relatively rotating shaft and a wall through which the shaft projects and which is a wall of a housing containing fluid.

A pump chamber housing or casing is indicated generally by the numeral 11, and a pump shaft by the numeral 12. The position of the shaft relative to the housing is fixed by virtue of its mounting in its bearings. These bearings (not shown) may be, and in the great majority of pump types are, of the outboard character, being located outside of and independently of the shaft seal and end walls of the pump housing.

A sealing means must be provided adjacent the clearance between the shaft and the end wall of the pump housing for preventing leakage of the pump fluid outwardly along the shaft through this clearance. And this seal should not, for best construction, contribute to the bearing support of the shaft. This seal has been customarily provided by annularly spacing a lateral extension of the pump housing end wall from the shaft and installing in this spacing a stuffing box or other sealing means.

In the drawings, a cylindrical chamber 13 lies between the shaft and the longitudinally outwardly extending portion 14 of the pump housing or casing 11. This chamber corresponds to the stuffing box chamber of pumps which are sealed by packing ring glands. The shaft seal of this invention is disposed partly within the chamber 13 and partly within a chamber 15 enclosed within a cylindrical seal housing 16 extending outwardly from the pump housing 11. This seal housing 16 is formed with slotted wings 17 extending outwardly on opposite sides of the seal housing 16. The housing 16 is secured to the housing 11 by means of bolts 18, which by means of eyes 19 formed at their inner ends are pivotally secured to studs 20 threaded into a wall 21 of a slotted recess 22 of the housing 11. These bolts lie in the slots of the wings 17 and the seal housing 16 is drawn into contact with the pump housing 11 by nuts 23 threaded on the outer ends of the bolts 18.

A fluid tight seal is effected between the seal housing 16 and the adjacent portion 14 of the pump housing by means of a ring 24 seated in a shouldered recess 25 in the inner end of the seal housing 16, and a sealing washer 26 lying between the seal housing 16 and ring 24 on the one side and the portion 14 of the pump housing 11 on the other side.

One of the sealing elements of the invention is a collar 27 which is secured to the shaft 12 for rotation therewith by one or more set screws 28. The bore of this collar has a forced fit fluid tight contact with the shaft or other suitable means may be provided to effect a fluid tight seal between the collar and shaft. This collar 27 has at its outer end an annularly projecting flange 29 and a sleeve portion 30 extending longitudinally outwardly from the flange 29.

A ring of magnetizable material 30a, such as "Alnico," is seated against the flange 29 and within the sleeve portion 30 and secured to rotate with the collar 27 by being pressed to a forced fit within the sleeve portion 30 or by the use of a bonding adhesive or by both these means, or by any other suitable means.

The other sealing element consists of an annular member 31 which is mounted on the seal housing 16 in a manner to prevent its rotation with respect to the seal housing and yet to permit a slight longitudinal movement with respect to the seal housing. These mounting conditions may be obtained, as they are in the embodiment presented in the drawings, by means of a diaphragm 32 of flexible material, for example, rubberized fabric, which is immovably secured at its inner periphery to the member 31 and is likewise immovably secured at its outer periphery to the seal housing 16. Securement to the member 31 is effected between a radially extending face 33 of a shoulder formed on the member 31 and a ring 34 which is pressed on to a sleeved outward extension 35 of the member 31.

The diaphragm 32 is secured at its outer periphery to the seal housing 16 by a cap 36 which is threaded to the outer end of the seal housing 16 and may be tightened on to the seal housing by a spanner wrench (not shown) which operatively engages spanner holes 37 in the outer face of the central web portion 38 of the cap 36. A ring washer 39 may be interposed between the web 38 and the diaphragm 32.

A ring 40 of "Alnico" or other magnetizable material is securely seated within a recess formed in the inner end of the member 31 against rotation relative to the member 31, this member being formed to receive the magnetizable ring 40 in the same fashion as in the outer end of the collar 27. An antifriction material may be bonded adhesively or otherwise secured in immovable relationship to the "Alnico" ring 30a so that it will rotate with the ring 30a and the other parts of the sealing element 27.

It will be observed from an inspection of Figure 1 that the fluid under pressure within the pump chamber may travel through chamber 13, then between collar 27 and the adjacent portion 14 of the pump housing to chamber 15 and thence to a small compression chamber 42 between the inner face of the diaphragm 32 and the outer face of a flange 43 of the sealing member 31. The fluid under pressure of the pump chamber, contained within this compression chamber 42 forces the sealing member 31 and with it the "Alnico" ring 40 into pressural contact with the antifriction ring 41 which is a part of the sealing member 27. The diaphragm 32 gives inwardly between its outer and inner peripheries sufficiently to permit a slight longitudinal movement with respect to the sealing element 27. A sliding sealing contact is thus established between the "Alnico" ring 40 and the antifriction ring 41. The ring washer 39 stiffens the diaphragm 32 against the pressure of fluid within the compression chamber 42, limiting movement resulting from the pressure to inward movement of the member 31.

The "Alnico" rings 30a and 40 are permanently magnetized prior to installation in the sealing elements 27 and 31. This magnetization is established in the "Alnico" rings with the lines of magnetic flux directed transversely of the rings, i. e., parallel to the shaft axis, and with the north pole of one ring adjacent the south pole of the other ring. These polar areas are at the annular radially extending end faces of the rings; the north pole of each ring being one axially end portion of the ring and the south pole being the other axially end portion of the ring. If the rightward end of one ring is its north pole, the rightward end of the other ring is also a north pole. The flux circuit is completed around the outer and inner peripheries of the two rings considered together as a single generator of magnetic flux.

The magnetic attraction between the rings serves to maintain contact between them when the pump is idle and serves to re-establish contact when due to surging of the fluid within the pump chamber or to any other cause, the shaft moves longitudinally sufficiently to break contact between the magnetized ring 40 and the antifriction ring 41.

While in the structure shown in the drawings the several elements of the seal assembly are shown as formed to provide a means of applying fluid pressure to effect a sealing contact between the two sealing elements, it will be understood that the magnetic attraction may be relied upon to supply the entire sealing pressure to hold the sealing elements 27 and 31 in sealing contact, and the invention is applicable either to seals employing fluid pressure to effect the sealing contact or to seals in which fluid pressure is not utilized for that purpose. If the fluid pressure feature is omitted, the magnetic members must possess sufficient magnetic attractive strength to hold the two sealing elements into sealing contact under the conditions of any particular installation or type of pump. This form of the invention in which fluid pressure is not utilized, is practical to seal against pressures in pumps characterized by fluid pressures of low value.

It is apparent that if so desired, magnetic attraction between the magnetizable rings may be increased by the use of coils of electrical conductors around the peripheries of one or both magnetic rings which may be electrically energized by electric current conducted to the coils. In such an embodiment of the invention, if both rings have coils, the current will be conducted to the coil on the rotatable sealing element by means of slip rings. Otherwise, only the stationary magnet will have a coil wound upon it. Since this embodiment of the invention is unpatentable over the embodiment of the invention shown herein, no claims specific to it are made herein.

I claim:

In a shaft for sealing a joint between a fluid chamber housing and a relatively rotating shaft projecting through the housing, the combination with the shaft and the housing of: a collar fixedly secured in fluid tight relation to the shaft to rotate therewith, the collar being recessed axially at its outer end to form an annular first seat; a ring of "Alnico" magnetizable material seated in the first recess and magnetized with its flux lines arranged axially with a given direction of polarity; a seal housing extending outwardly of the chamber housing and surrounding the shaft and collar and annularly spaced therefrom; a sleeve longitudinally movably mounted on the housing within the space between the housing and shaft and similarly recessed to provide a second seat adjacently juxtaposed to the first seat; a ring of "Alnico" magnetizable material seated in the second recess and magnetized with its flux lines arranged axially with the same said given direction of polarity; a ring of antifriction material fixedly secured to one of the rings of "Alnico" magnetizable material; a diaphragm of flexible material fixedly secured to the seal housing at its outer periphery and fixedly secured to the sleeve at its inner periphery for mounting the sleeve on the seal housing; and a ring of rigid inflexible material rigidly secured at its outer periphery to the seal housing and disposed to prevent outward movement of the diaphragm under fluid pressure, the inner periphery of the ring of rigid inflexible material being of a sufficiently large diameter and suitably disposed to permit longitudinal movement of the sleeve, the shaft collar and sleeve being spaced circumferentially and longitudinally from the chamber housing and seal housing to provide a compression chamber between the diaphragm and sleeve and a continuous fluid chamber between the compression chamber and the fluid chamber housing.

References Cited in the file of this patent

UNITED STATES PATENTS

| Number | Name | Date |
| --- | --- | --- |
| 1,339,156 | Beldam | May 4, 1920 |
| 1,571,633 | McNutt | Feb. 2, 1926 |
| 1,872,182 | Pohl | Aug. 16, 1932 |
| 1,927,543 | Doyle | Sept. 19, 1933 |
| 2,143,825 | Abramson | Jan. 10, 1939 |
| 2,352,784 | Geyer | July 4, 1944 |
| 2,419,385 | Beier | Apr. 22, 1947 |
| 2,515,410 | Laas | July 18, 1950 |
| 2,556,225 | Serge | June 12, 1951 |